United States Patent [19]
Woollums et al.

[11] Patent Number: 5,700,950
[45] Date of Patent: Dec. 23, 1997

[54] PROVER ADAPTER FOR A FLUID METERING DEVICE

[75] Inventors: David E. Woollums, Frisco; Gregory L. Foust, Richardson, both of Tex.

[73] Assignee: Fisher Controls International, Inc., Clayton, Mo.

[21] Appl. No.: 661,298

[22] Filed: Jun. 13, 1996

[51] Int. Cl.$^6$ .................................................. G01F 25/00
[52] U.S. Cl. ........................................................... 73/3
[58] Field of Search ................................. 73/3, 1 G, 201; 248/904

[56] References Cited

U.S. PATENT DOCUMENTS

| | | | |
|---|---|---|---|
| 2,795,950 | 6/1957 | Liddell | 73/3 |
| 4,027,523 | 6/1977 | St. Clair | 73/3 |
| 5,111,682 | 5/1992 | Halpin | 73/3 |
| 5,515,722 | 5/1996 | Roberts | 73/263 |

FOREIGN PATENT DOCUMENTS 163378  11/1964  U.S.S.R. ...................................... 73/3

OTHER PUBLICATIONS

Fisher, "Snug™ Compact Meter Type 250CM," *Fisher Controls International, Inc.*, Bulletin 71.9:250CM, pp. 1–12 (May 1996).

Fisher, "Snug™ Type 250CM," *Fisher Controls International, Inc.*, Instruction Manual, Form 5414, pp. 1–23 (Jun. 1996).

*Primary Examiner*—Robert Raevis
*Attorney, Agent, or Firm*—Marshall, O'Toole, Gerstein, Murray & Borun

[57] ABSTRACT

An adapter for use with a fluid metering device includes a support structure which holds and supports the fluid metering device in an upright position while the fluid metering device is being tested with a testing device or a prover. The adapter also includes a fluid passageway having one end thereof coupled to the fluid inlet of the fluid metering device and having another end thereof positioned at a predetermined distance away from, and at a predetermined orientation with respect to, the fluid outlet of the fluid metering device to thereby enable a standard prover to be used with a fluid metering device having a non-standard inlet and outlet configuration.

7 Claims, 3 Drawing Sheets

PROVER ADAPTER FOR A FLUID METERING DEVICE

TECHNICAL FIELD

The present invention relates generally to fluid metering devices and, more particularly, to adapters for use in testing and calibrating gas metering devices.

BACKGROUND ART

Fluid flow metering devices, such as natural gas meters, are typically placed somewhere in a fluid line to measure the amount of a fluid being consumed by, for example, a particular commercial or residential customer. In the natural gas industry, most fluid flow meters are constructed to be of a standard size and to have a standard fluid inlet and outlet configuration. In these so-called standard gas meters, the fluid inlets and outlets are located on the top of the meter at a predetermined distance away from one another, usually six inches. Standard gas meter inlets and outlets also open or face outwardly in the same direction, i.e., the openings of these inlets and outlets have non-coaxial normals which point in the same direction. Standard gas meters are also rather bulky and have large bases so that these meters can stand upright without further outside support.

Fluid flow meters, such as natural gas meters, typically include one or more metal diaphragms that cycle back and forth in response to the flow of fluid through the meter. These fluid flow meters then report the flow of fluid as a function of the number of measured diaphragm cycles.

Because fluid flow meters are used for billing purposes, it is important that these meters measure the amount of fluid flowing therethrough to a high degree of accuracy. As a result, fluid metering device testers or "provers" have been designed to test and calibrate fluid flow metering devices immediately after construction of these devices or periodically during use of these devices.

To test a fluid meter, a prover is placed into contact with the fluid meter so that a fluid outlet of the prover comes into contact with the fluid inlet of the meter and so that a fluid inlet of the prover comes into contact with the fluid outlet of the meter. The prover then applies pressure to the fluid meter so that rubber seals on the prover inlet and outlet engage the inlet and outlet of the fluid meter in a sealed manner. Thereafter, the prover forces a predetermined amount of fluid, such as air, through the fluid meter and determines the amount of flow measured by the fluid meter using, for example, a proximity sensor placed against an outer casing of the fluid meter. This proximity sensor may use electromagnetic principles to count the number of times the diaphragm within the fluid meter moves back and forth, thereby to determine the fluid meter reading. The prover also measures the amount of fluid injected through the fluid meter and compares the reading of the fluid meter with the prover measurement to determine how accurately the fluid meter measures fluid flow. Moreover, provers measure the gas pressure at the inlet and the outlet of the prover to determine the pressure drop across the fluid meter. This pressure drop measurement is necessary to determine whether the fluid meter is calibrated according to industry standards.

As is apparent, provers must be designed and calibrated to provide a highly accurate measurement of the actual amount of fluid injected through a meter during testing thereof. Bell provers, for example, use a calibrated bell to measure the displacement of a liquid to determine the actual amount of gas injected into a fluid meter. Sonic nozzle provers, such as those manufactured by the American Meter Company, use differential pressure through a sonic nozzle to measure or control the amount of fluid injected into a fluid meter. Because of the highly accurate nature of these devices, provers are very expensive, typically costing tens of thousands of dollars each.

Most provers are designed to be used with standard fluid meters and, therefore, have an inlet and an outlet which are separated by a predetermined amount, typically six inches. Furthermore, the inlets and outlets of these standard provers face outwardly in the same direction in order to couple directly to the top mounted inlets and outlets of standard fluid meters, such as gas meters.

Recently, however, new types of non-standard fluid meters have been developed. These non-standard fluid meters are not of the standard size and configuration and, as such, are not typically designed to have a stable base capable of supporting the meter in an upright position. Because these non-standard meters are incapable of standing upright on their own, it is difficult, if not impossible, to use standard provers to test these non-standard meters. In fact, these non-standard meters tend to simply fall over when a prover tries to apply pressure thereto in an attempt to form a seal between the prover and meter inlet and outlet.

Also, in some cases, these new meters have nonstandard fluid inlet and outlet configurations, such as a fluid inlet and a fluid outlet disposed on opposites sides of the meter. In such a case, the meter inlet and outlet openings do not face outwardly in the same direction and are not at the standard predetermined distance apart. As a result, the meter inlet and outlet openings of these new meters do not match up to standard prover inlets and outlets, thereby preventing use of standard provers with these non-standard meters.

While new provers can be designed and manufactured to be compatible with these new, non-standard fluid meters, such newly designed provers will still be very expensive. As a result, gas companies and other fluid meter purchasers, which already own standard provers, may resist purchasing the new, non-standard fluid meters simply because of the expense associated with purchasing provers necessary to support these new fluid meters. It is desirable, therefore, to make these non-standard fluid meters compatible with standard provers.

SUMMARY OF THE INVENTION

The present invention provides an adapter which can be used with a non-standard fluid meter to make the non-standard fluid meter compatible with a standard prover. In particular, an adapter constructed according to the present invention includes a guide for holding a fluid meter in place and a base which supports the fluid meter in an upright position while the meter is being tested with a prover or other testing device. The adapter may also include a fluid passageway which couples to the fluid inlet or to the fluid outlet of a fluid meter when that meter is supported by the guide. An end piece on the fluid passageway is positioned in a standard orientation and is located at a standard distance away from the other of the fluid meter inlet or outlet so that the adapter/meter pair couples directly to the inlet and outlet of a standard prover.

According to another aspect of the present invention, a method of testing a fluid metering device with a prover having a fluid inlet and a fluid outlet spaced apart by a predetermined distance includes the step of providing a sealed fluid passageway between one of a fluid inlet and a fluid outlet of the fluid metering device so that an end of the fluid passageway is disposed at the predetermined distance away from the other one of the fluid inlet and the fluid outlet of the fluid metering device. Thereafter, one of the fluid inlet and the fluid outlet of the prover is coupled with the end of the fluid passageway and the other one of the fluid inlet and the fluid outlet of the prover is coupled with the other one of the fluid inlet and the fluid outlet of the fluid metering device. The prover is then used to inject fluid through the fluid metering device and the fluid passageway to test the fluid metering device.

DETAILED DESCRIPTION

Figure 1:
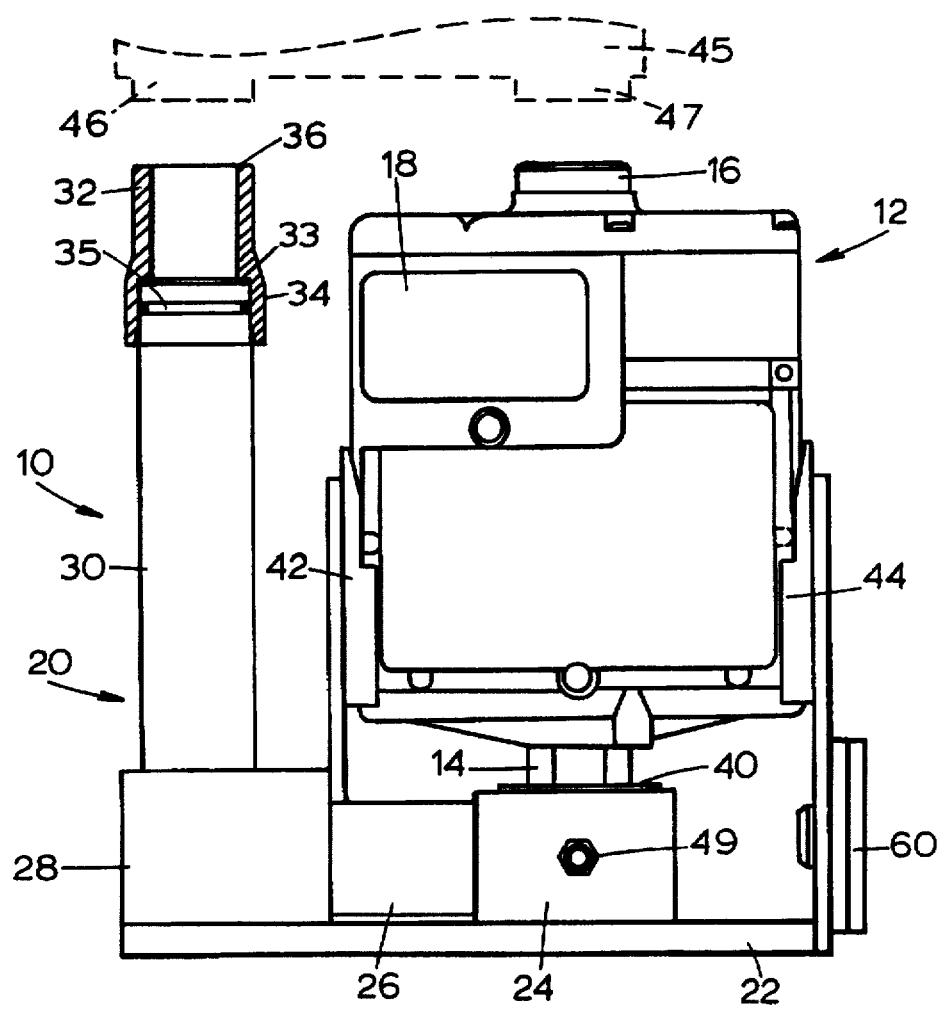
FIG. 1 is a partially cut-away, front view of an adaptor unit according to the present invention having a first fluid meter installed thereon.

Referring now to FIG. 1, an adaptor unit 10 according to the present invention is illustrated having a fluid meter 12 installed in an upright position thereon. The fluid meter 12 includes an inlet port 14 at a lower end thereof, an outlet port 16 at an upper end thereof and a display 18 which may include, for example, dials or digital readouts indicating the fluid flow measurements made by the meter 12. The meter 12 may be any desired type of fluid meter and may operate to measure fluid flow according to any desired or conventional metering principals, such as those commonly used by commercial or residential gas meters. The fluid meter 12 illustrated in FIG. 1 is a bottom-in/top-out, SNUG™ Compact Meter, manufactured for Fisher-Controls International, Inc.

Figure 2:
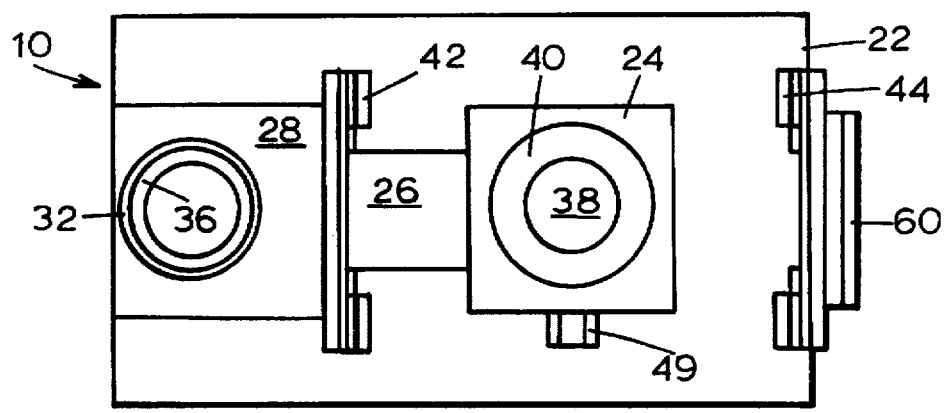
FIG. 2 is a top view of the adaptor unit of FIG. 1 without a fluid meter installed thereon.
Figure 3:
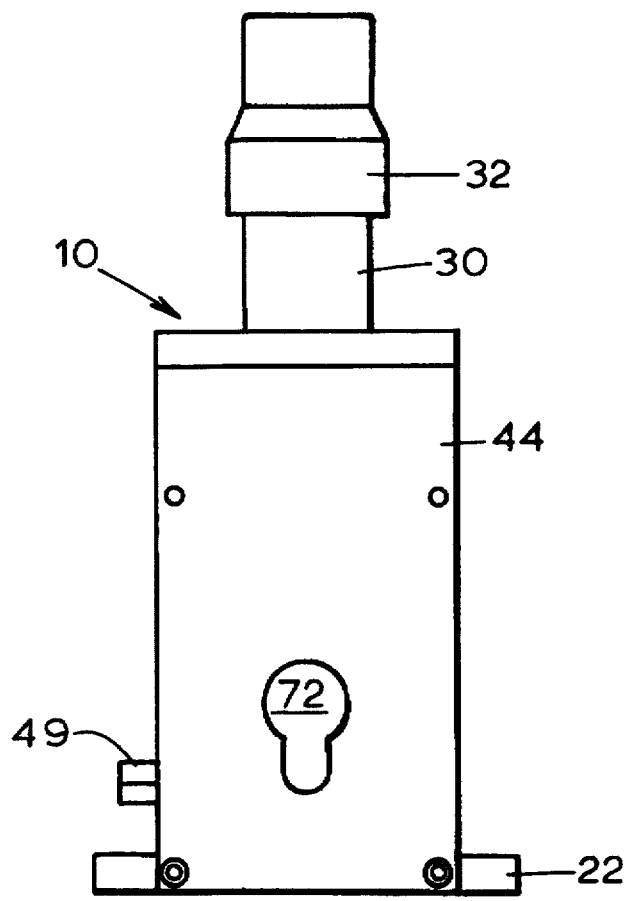
FIG. 3 is a side view of the adaptor unit of FIG. 1 with a mounting pad removed and without a fluid meter installed thereon.

The adapter unit 10, illustrated in FIGS. 1, 2 and 3, includes a fluid passageway 20 mounted on a base 22. The fluid passageway 20 includes a pedestal 24, a fluid tube 26 extending between the pedestal 24 and a corner connector 28 and a further fluid tube 30 extending from the corner connecter 28 at a right angle to the fluid tube 26. The fluid passageway 20 may also be attached to or may include a removable end piece 32, illustrated in a cross-sectional view in FIG. 1. The end piece 32 is preferably disposed on a neck portion of the fluid tube 30 such that a lip 33 of the end piece 32 rests on an end of the fluid tube 30 to prevent the end piece 32 from moving downwardly over the fluid tube 30. An O-ring 34 is disposed within a groove 35, formed into the fluid tube 30, to provide a seal between the fluid tube 30 and the end piece 32.

The pedestal 24, the corner connector 28, the tubes 26 and 30 and the end piece 32 are hollow and form a sealed fluid passageway between an upper end 36 of the end piece 32 and an opening 38 in the upper portion of the pedestal 24 (FIG. 2). Furthermore, a rubber or other seal 40 is disposed on top of the pedestal 24 around the opening 38 and is designed to couple to the fluid inlet 14 of the meter 12.

Fluid meter guides 42 and 44 extend from the base 22 and the corner connector 28 to hold the fluid meter 12 on the pedestal 24. Preferably, the guides 42 and 44 are made of plastic to prevent scratching or other damage to the fluid meter 12 but, alternatively, may be made of any other desired material. Also, preferably, the guides 42 and 44 have an opening between them to allow a proximity sensor associated with a prover to be disposed adjacent the fluid meter 12 when the fluid meter 12 is disposed within the guides 42 and 44.

The fluid meter 12 is mounted on the adaptor unit 10 by inserting the meter 12 between the guides 42 and 44 and sliding it down towards the pedestal 24 until the fluid inlet 14 comes into contact with the rubber seal 40. In such a configuration, the longitudinal axis of the fluid inlet 14 aligns with the longitudinal axis of the opening 38 in the rubber seal 40 and the top of the pedestal 24.

The fluid passageway 20 and the end piece 32 are designed so that the upper end 36 of the end piece 32 lies in approximately the same plane as the upper end of the fluid outlet 16 of the meter 12 when the fluid inlet 14 of the meter 12 contacts the rubber seal 40. Furthermore, the fluid passageway 20 and the end piece 32 are designed so that the center, i.e., the longitudinal axis, of the opening at the upper end of the end piece 32 is a predetermined distance away from the center, i.e., the longitudinal axis, of the opening in the fluid outlet 16 when the meter 12 is disposed on the adapter unit 10. Preferably, this predetermined distance is six inches, which is the distance between the fluid inlet and the fluid outlet of standard gas meters. As illustrated in FIG. 1, the opening in the end piece 32 and the opening in the fluid outlet 16 face outwardly in the same direction, i.e., the longitudinal axes of the openings in the end piece 32 and the fluid outlet 16 are parallel.

During testing with a prover 45, partially illustrated in phantom relief in FIG. 1, a rubber seal on an outlet 46 of the prover 45 is placed adjacent the end 36 of the end cap 32 while a rubber seal on an inlet 47 of the prover 45 is placed adjacent the fluid outlet 16 of the meter 12. If desired or necessary, a proximity sensor associated with the prover 45 (not shown) may be placed adjacent the fluid meter 12 in an open space between the guides 42 and 44. The prover 45 then applies pressure to the end cap 32 and the fluid meter 12 which compresses the rubber seals on the prover outlet 46 and the prover inlet 47 and the rubber seal 40 to seal the connections between the prover outlet 46 and the end piece 32, the prover inlet 47 and the fluid outlet 16, and the fluid inlet 14 and the pedestal 24. During this time, the guides 42 and 44, the pedestal 24 and the base 22 support the meter 12 in an upright position and prevent the meter 12 from tipping over.

Next, the prover 45 injects fluid, such as air, into the end piece 32 so that the fluid travels through the fluid passageway 20, past the rubber seal 40 and into the fluid inlet 14 of the meter 12. The injected fluid is then forced through the meter 12, where it is registered, and through the fluid outlet 16 back into the inlet 47 of the prover 45 where the volume of the fluid is measured and compared with the reading made by the proximity sensor of the prover 45.

To make an accurate flow reading in a gas meter, the prover 45 must also measure the pressure drop between the fluid inlet 14 and the fluid outlet 16 of the meter 12. Typically, this measurement is made by measuring the pressure differential between the injected gas at the prover outlet 46 and the returned gas at the prover inlet 47. However, when the fluid passageway 20 of the adapter unit 10 is used, such measurements provide the gas pressure differential between the end piece 32 of the adapter unit 10 and the fluid outlet 16 of the meter 12, not the inlet and outlet of the meter itself. To overcome this problem, a pressure fitting 49 extends through a wall of the pedestal 24, which comprises a fluid chamber. During operation of the prover 45, tubing is attached to the pressure fitting 49 and to an appropriate pressure port on the prover 45, i.e., a port which is used by the prover 45 to measure the pressure of the gas at the inlet of the fluid meter being measured. Thereafter, the prover 45 will automatically measure the pressure differential between the fluid inlet 14 and the fluid outlet 16 of the meter 12.

Use of the adapter unit 10 in the above-described manner allows a standard prover 45 having fluid inlets and outlets configured in a predetermined and standard orientation and location with respect to one another to be used to test a fluid meter which has a non-standard inlet and outlet configuration and/or a fluid meter which is not capable of standing in a stable and upright position by itself.

While the adapter unit 10 has been illustrated as being configured for use with a particular type of non-standard fluid meter having an inlet port on the bottom and an outlet port on the top thereof, it is noted that the adapter unit 10 can be configured for different types of standard and non-standard fluid meters, including fluid meters which have an inlet port on the top and an outlet port on the bottom, both the inlet and the outlet ports on the top, the sides, or the bottom thereof or inlet and outlet ports which are on different ones of the sides, the top and the bottom. Also, the end piece 32 and/or the guides 42 and 44 can be moveable or replaceable to accommodate different types of fluid meters, while the tubes 26 and 28 can be slidable, moveable or otherwise adjustable to accommodate different types and sizes of fluid meters.

Figure 4:
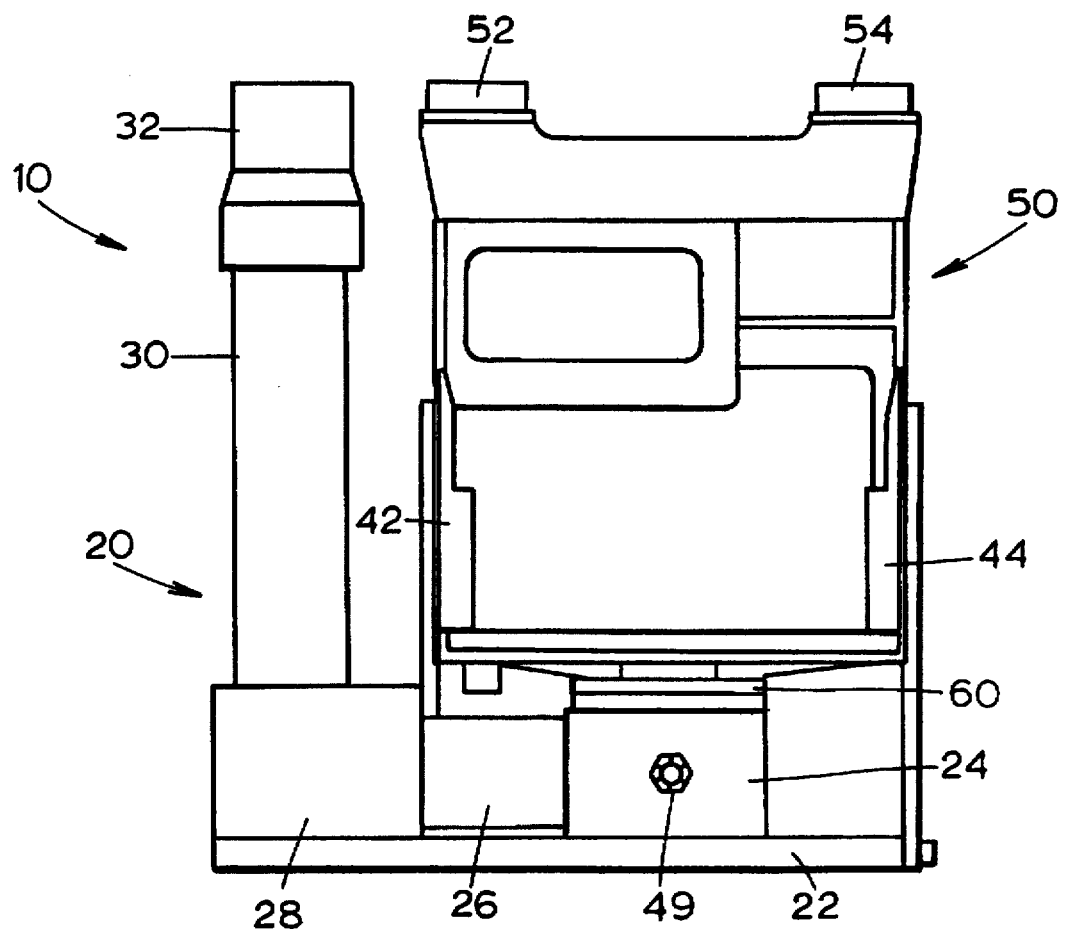
FIG. 4 is a front view of an adaptor unit according to the present invention having a second fluid meter installed thereon.

Referring now to FIG. 4, the adaptor unit 10 is illustrated in use with a fluid meter 50 having a standard top-in/top-out configuration, i.e., a configuration compatible with standard provers. As such, a fluid inlet 52 and a fluid outlet 54 are located on the top of the meter 50 so that these ports are located a predetermined and standard distance apart from one another and so that the openings of these ports face outwardly in the same direction. A standard prover can be placed adjacent the inlet 52 and the outlet 54 of the fluid meter 50 in the normal manner without use of the fluid passageway 20.

However, the fluid meter 50 is incapable of supporting itself in a stand-alone manner and, therefore, is not easily tested with a standard prover which requires that the meter being tested be supported in an upright and stable manner. The adapter unit 10 of FIG. 4 is, therefore, used to support the fluid meter 50 in an upright position during testing with a standard prover.

Similar to the fluid meter 12 of FIG. 1, the fluid meter 50 is inserted between the guides 42 and 44 and is supported by the pedestal 24 and the base 22 of the adaptor unit 10. However, to protect the rubber seal 40, a mounting pad 60 is inserted between the pedestal 24 and the bottom of the meter 50.

Figure 5:
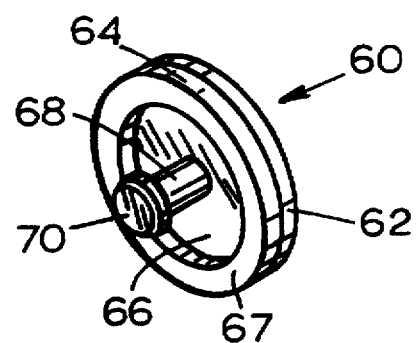
FIG. 5 is a perspective view of a mounting plug associated with the adaptor unit of FIG. 4.

Preferably, the mounting pad 60, which is illustrated in detail in FIG. 5, comprises a rubber or other soft or malleable pad 62 mounted on a metal or plastic base 64. The base 64 includes a recessed area 66 circumscribed by a lip 67 on the underside thereof. A pin 68 having a head portion 70 extends from the center of the recessed area 66.

When the adaptor unit 10 is used only as a support for a fluid meter, such as illustrated in FIG. 4, the pin 68 and the head 70 of the mounting pad 60 are inserted into the opening 38 in the top of the pedestal 24. The recessed area 66 is configured to allow the rubber seal 40 on the pedestal 24 to be disposed therein so that pressure applied to the mounting pad 62 by the meter 50 is transferred through the base 64 and the lip 67 to the pedestal 24 without being transferred through the rubber seal 40. In such a manner, the mounting pad 60 protects the rubber seal 40 when the fluid passageway 20 of the adapter unit 10 is not being used. When not in use, the mounting pad 60 may be stored on the side of the guide 44 by inserting the head 70 and the pin 68 into a hole 72 formed in the guide 44 (FIG. 3) and sliding the mounting pad 60 down to a lower portion of the hole 72. Because the lower portion of the hole 72 has a diameter which is less than the diameter of the head 70, the head 70 is prevented from coming out of the hole 72 and thereby holds the mounting pad 60 on the guide 44.

While the present invention has been described with reference to specific examples, which are intended to be illustrative only and not to be limiting of the invention, it will be apparent to those of ordinary skill in the art that changes, additions, and/or deletions may be made to the disclosed embodiments without departing from the spirit and the scope of the invention.

We claim:

1. An apparatus for supporting a fluid metering device when the fluid metering device is being tested by a testing device, wherein each of the fluid metering device and the testing device has a fluid inlet and a fluid outlet separated by a predetermined distance, the apparatus comprising:

means for mounting the fluid metering device in an upright position to allow the fluid inlet and the fluid outlet of the testing device to be placed in pressurized contact with the fluid outlet and the fluid inlet of the fluid metering device, respectively, said mounting means including two guides that contact opposite sides of the fluid metering device at locations away from the fluid inlet and the fluid outlet of the fluid metering device; and a base coupled to the mounting means which supports the mounting means and the fluid metering device when the fluid metering device is disposed in the mounting means.

2. The apparatus of claim 1, wherein the mounting means further includes a pedestal member disposed between the base and a further side of the fluid metering device, when the fluid metering device is disposed in the mounting means, to transfer force from the fluid metering device to the base.

3. The apparatus of claim 2, wherein the pedestal member includes a soft material which contacts the further side of the fluid metering device when the fluid metering device is disposed in the mounting means.

4. An apparatus for use with a fluid metering device having a fluid inlet and a fluid outlet when the fluid metering device is being tested by a testing device having a fluid inlet and a fluid outlet separated by a predetermined distance, the apparatus comprising:

means for mounting the fluid metering device;

means for coupling to one of the fluid inlet and the fluid outlet of the fluid metering device when the fluid metering device is disposed in the mounting means;

an end piece disposed at the predetermined distance from the other one of the fluid inlet and the fluid outlet of the fluid metering device when the fluid metering device is disposed in the mounting means;

a fluid passageway disposed between the end piece and the coupling means; and a base which supports the mounting means;

wherein the coupling means is located between the base and the mounting means to transfer force from the fluid metering device to the base when the fluid metering device is disposed in the mounting means.

5. The apparatus of claim 4, wherein the coupling means includes a sealing member and wherein the apparatus further includes a mounting pad for insertion between the coupling means and the fluid metering device when the fluid metering device is disposed in the mounting means so that the mounting pad directs the force from the fluid metering device to the base without transferring the force through the sealing member.

6. An apparatus for use with a fluid metering device having a fluid inlet and a fluid outlet when the fluid metering device is being tested by a testing device having a fluid inlet and a fluid outlet separated by a predetermined distance, the apparatus comprising:

means for mounting the fluid metering device;

means for coupling to one of the fluid inlet and the fluid outlet of the fluid metering device when the fluid metering device is disposed in the mounting means;

an end piece disposed at the predetermined distance from the other one of the fluid inlet and the fluid outlet of the fluid metering device when the fluid metering device is disposed in the mounting means; and a fluid passageway disposed between the end piece and the coupling means;

wherein the mounting means includes two guides which contact opposite sides of the fluid metering device when the fluid metering device is disposed in the mounting means and which provide a space therebetween that enables a proximity sensor associated with the testing device to be placed adjacent the fluid metering device when the fluid metering device is disposed in the mounting means.

7. A method of testing a fluid metering device having a fluid inlet and a fluid outlet using a prover having a fluid inlet and a fluid outlet spaced apart by a predetermined distance, the method comprising the steps of:

providing a sealed fluid passageway between one of the fluid inlet and the fluid outlet of the fluid metering device such that an end of the fluid passageway is disposed at the predetermined distance away from the other one of the fluid inlet and the fluid outlet of the fluid metering device;

coupling one of the fluid inlet and the fluid outlet of the prover with the end of the fluid passageway and coupling the other one of the fluid inlet and the fluid outlet of the prover with the other one of the fluid inlet and the fluid outlet of the fluid metering device;

using the prover to test the fluid metering device by injecting fluid through the fluid metering device and the fluid passageway;

inserting the fluid metering device in a support structure attached to the fluid passageway and using the support structure to support the fluid metering device in an upright position during the step of using the prover to test the fluid metering device; and using a portion of the fluid passageway to support the fluid metering device in the upright position during the step of using the prover to test the fluid metering device.

* * * * *